Dec. 29, 1925.
I. C. WOOD
1,567,480
GLARESHIELD FOR MOTOR VEHICLES
Filed August 28, 1924
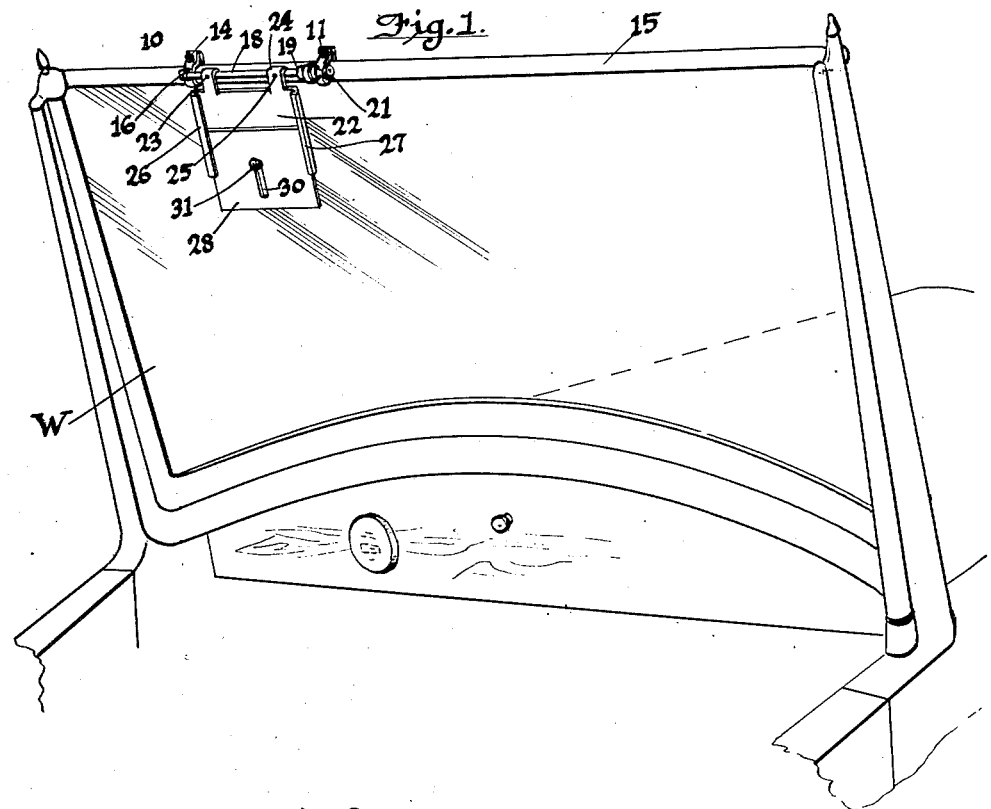
Fig. 1.
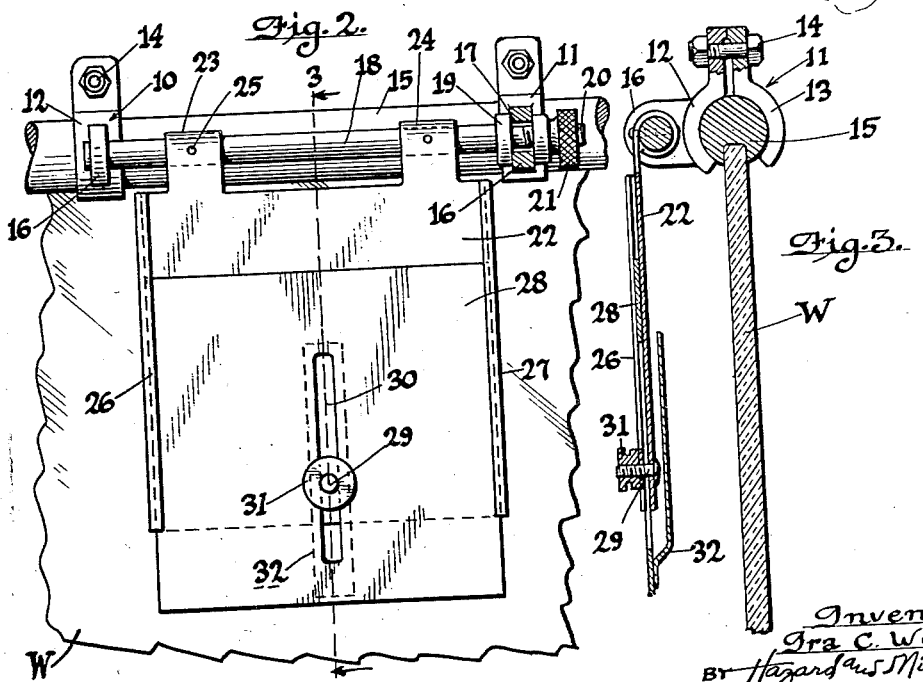
Fig. 2.
Fig. 3.
Inventor.
Ira C. Wood.
By Hazard and Miller
Attorneys.
Witness:
W. F. Hull Patented Dec. 29, 1925.

1,567,480

UNITED STATES PATENT OFFICE.

IRA C. WOOD, OF SOUTH PASADENA, CALIFORNIA, ASSIGNOR OF THREE-FOURTHS TO WILSON M. HUNT, OF FULLERTON, CALIFORNIA.

GLARESHIELD FOR MOTOR VEHICLES.

Application filed August 28, 1924. Serial No. 734,620.

*To all whom it may concern:*

Be it known that I, IRA C. WOOD, a citizen of the United States, residing at South Pasadena, in the county of Los Angeles and State of California, have invented new and useful Improvements in Glareshields for Motor Vehicles, of which the following is a specification.

This invention relates to improvements in glare shields, which are primarily designed to be associated with the windshield of an automobile so as to protect the driver of the automobile from glaring light directed toward the automobile.

It is an object of the invention to provide a glare shield formed of opaque material which is detachably secured adjacent the top of a windshield sash, and which may be swung upwardly into a position at an angle to the windshield so as to be out of the way, or may be swung downwardly into a position parallel with the windshield when being utilized.

It is a further object of the invention to provide a glare shield adapted to be attached to a windshield which is capable of having the area covered by the glare shield increased or decreased as desired.

With the foregoing and other objects in view which will be made manifest in the following detailed description and pointed out in the appended claims, reference is had to the accompanying drawings for an illustrative embodiment of the invention, wherein:

Figure 1 is a perspective view of a windshield to which the improved glare shield is applied, Fig. 2 is a side elevation of the portion of the windshield shown in Fig. 1, to which the improved glare shield is secured, and Fig. 3 is a vertical section taken substantially upon the line 3—3 of Fig. 2.

Referring to the accompanying drawings wherein similar reference characters designate similar parts throughout, the improved glare shield consists of a pair of brackets 10 and 11, formed of a pair of arcuate members 12 and 13 which are secured together as by a bolt 14 or its equivalent, so that the arcuate members 12 and 13 may be clamped upon the top frame member 15 of the windshield sash W. The arcuate members 12 of the brackets 10 and 11 have extensions 16 which are apertured as at 17 to receive the ends of a spindle 18. The spindle 18 is provided with an angular flange 19 which engages the inner side of the extension 16 of the bracket 11. The end 20 of the spindle 18 is threaded to receive a thumb nut 21.

The improved glare shield may be made of metal or other opaque material, and consists of a section 22 preferably having formed intergral therewith hooks 23 and 24 adapted to be passed over the spindle 18 and secured thereto by means such as rivets 25.

As a means for increasing or decreasing the area of the improved glare shield, side edges 26 and 27 of the section 22 are bent upwardly and over so as to provide a pair of grooves in which a second section 28 may slide. A bolt 29 is secured to the section 22, and extends through a slot 30 formed in the second section 28. A thumb nut 31 is adapted to be screwed down upon the bolt 29 engaging the second section 28 so as to hold the second section in a given position with respect to the first section 22. A suitable strip of material 32 is secured to the back of the second section 28 so as to cover the slot 30 and prevent light from passing therethrough.

It is well recognized that numerous glare shields have been provided which attempt to remove the glare of light coming towards a vehicle which are translucent. My improved glare sheild is distinguished from such devices by the fact that it is opaque, it being readily understood that if the automobile is being driven toward the sun, the glare shield may be interposed between the driver's eyes and the sun, permitting the driver to clearly see the road by looking beneath the glare shield or to one side thereof.

It is to be understood that various changes may be made in the detail of construction without departing from the spirit or scope of the invention as defined by the appended claims.

I claim:

1. A glare shield comprising a section of opaque material, spindle means for pivotally securing said section to a windshield sash, whereby said section may be held parallel to said sash or held at right angles thereto by means of the spindle adjustment, a second section slidably mounted upon the first mentioned section, a bolt secured to said first section, a slot in the second section through which the bolt extends, a thumb nut adapted to be screwed upon said bolt thereby holding said second section in a given position with respect to the first section, and a strip of material secured upon the back of said second section adapted to cover said slot.

2. A glare shield comprising a section of opaque material, means for pivotally securing said section to a windshield sash, whereby said section may be held parallel to said sash or held at right angles thereto, a second section slidably mounted upon the first mentioned section, a bolt secured to said first section, a slot in the second section through which the bolt extends, a thumb nut adapted to be screwed upon said bolt, thereby holding said second section in a given position with respect to the first section, and a strip of material secured upon the back of said second section adapted to cover said slot.

In testimony whereof I have signed my name to this specification.

IRA C. WOOD.